(12) United States Patent
Kudas et al.

(10) Patent No.: US 9,043,011 B2
(45) Date of Patent: *May 26, 2015

(54) ROBOTIC MACHINING APPARATUS METHOD AND SYSTEM FOR TURBINE BUCKETS

(75) Inventors: Todd George Kudas, Elizabeth, PA (US); Brian David Albin, Chicago, IL (US)

(73) Assignee: General Electric Company, Schenectady, NY (US)

( * ) Notice: Subject to any disclaimer, the term of this patent is extended or adjusted under 35 U.S.C. 154(b) by 548 days.

This patent is subject to a terminal disclaimer.

(21) Appl. No.: 13/343,411

(22) Filed: Jan. 4, 2012

(65) Prior Publication Data

US 2013/0173043 A1    Jul. 4, 2013

(51) Int. Cl.
*B25J 9/02* (2006.01)
*B25J 13/08* (2006.01)
*B25J 11/00* (2006.01)
*B25J 19/02* (2006.01)
*B23C 3/18* (2006.01)
*F01D 5/22* (2006.01)
*F01D 5/24* (2006.01)

(52) U.S. Cl.
CPC .............. *B25J 11/005* (2013.01); *B25J 19/021* (2013.01); *B23C 3/18* (2013.01); *G05B 2219/37555* (2013.01); *G05B 2219/45147* (2013.01); *F01D 5/225* (2013.01); *F01D 5/24* (2013.01); *F05D 2220/31* (2013.01); *F05D 2230/80* (2013.01)

(58) Field of Classification Search
USPC ............... 700/160, 174; 901/9, 10, 41, 47
See application file for complete search history.

(56) References Cited

U.S. PATENT DOCUMENTS

| | | | | |
|---|---|---|---|---|
| 4,257,742 A | * | 3/1981 | Ogata et al. | 416/190 |
| 4,437,213 A | * | 3/1984 | Reese et al. | 29/33 K |
| 4,741,128 A | * | 5/1988 | Reaves et al. | 451/439 |
| 4,805,282 A | * | 2/1989 | Reaves et al. | 29/889.1 |
| 4,805,351 A | * | 2/1989 | Dobson et al. | 451/28 |
| 4,955,119 A | * | 9/1990 | Bonomi et al. | 29/50 |
| 5,152,058 A | * | 10/1992 | Legros | 29/889.1 |
| 5,165,829 A | * | 11/1992 | Ross et al. | 409/125 |

(Continued)

OTHER PUBLICATIONS

J. M. S. T. Motta, C. H. Llanos, G. C. Carvalho and S. C. A. Alfaro, "A Prototype of a Specialized Robotic System for Repairing Hydraulic Turbine Blades",Oct. 5-7, 2010,(IEEE); 1st International Conference on Applied Robotics for the Power Industry, Delta Centre-Ville, Montreal, Canada.*

(Continued)

*Primary Examiner* — Robert Fennema
*Assistant Examiner* — Yagnesh J Trivedi
(74) *Attorney, Agent, or Firm* — McNees Wallace & Nurick LLC

(57) ABSTRACT

A robotic apparatus for machining tenons on turbine buckets of a steam turbine machine is disclosed. The robotic apparatus includes a machining device having a spindle head. A robotic arm is coupled to the machining device and a base member is coupled to the robotic arm. The base member is mounted independently of the machine element. A vision system is provided for locating the tenon on the turbine bucket. A control system is coupled to the vision system, the machining device and the robotic apparatus. The control system is configured to control movement of the robotic apparatus and the machining device based upon vision system data and spatial information about the tenon and the turbine bucket.

7 Claims, 6 Drawing Sheets

(56) References Cited

U.S. PATENT DOCUMENTS

| | | | |
|---|---|---|---|
| 5,261,785 A * | 11/1993 | Williams | 415/169.2 |
| 5,701,669 A * | 12/1997 | Meier | 29/889.1 |
| 6,374,158 B1 | 4/2002 | Fusaro, Jr. | 700/254 |
| 6,376,801 B1 * | 4/2002 | Farrell et al. | 219/124.34 |
| 6,519,860 B1 * | 2/2003 | Bieg et al. | 33/503 |
| 6,526,657 B2 * | 3/2003 | Fischer et al. | 29/889.21 |
| 6,668,466 B1 * | 12/2003 | Bieg et al. | 33/503 |
| 7,009,137 B2 * | 3/2006 | Guo | 219/121.64 |
| 7,326,873 B2 * | 2/2008 | Fischer et al. | 219/121.45 |
| 7,503,125 B2 * | 3/2009 | Jordil et al. | 33/503 |
| 7,627,083 B2 * | 12/2009 | Ross et al. | 378/58 |
| 7,667,157 B2 * | 2/2010 | Zhang et al. | 219/121.63 |
| 7,809,523 B2 * | 10/2010 | Hunter et al. | 702/168 |
| 7,921,575 B2 * | 4/2011 | Little et al. | 33/503 |
| 7,966,856 B1 * | 6/2011 | Razi et al. | 72/53 |
| 2004/0148791 A1 * | 8/2004 | Eaton | 33/503 |
| 2005/0159840 A1 * | 7/2005 | Lin et al. | 700/245 |
| 2005/0166413 A1 * | 8/2005 | Crampton | 33/503 |
| 2006/0041448 A1 * | 2/2006 | Patterson et al. | 705/1 |
| 2006/0048364 A1 * | 3/2006 | Zhang et al. | 29/407.08 |
| 2010/0185315 A1 * | 7/2010 | Schmidt et al. | 700/160 |
| 2012/0251327 A1 * | 10/2012 | Dimmick, III | 416/219 R |
| 2013/0041624 A1 * | 2/2013 | Li | 702/168 |

OTHER PUBLICATIONS

Motta, J.M.S.T., Llanos C.H., Carvalho G.C., Alfraro S.C.A., "A prototype of a Specialized Robotic System for Repairing Hydraulic Turbine Blades", International Conference on Applied Robotics for the Power Industry, Canada, 2010, pp. 1-6.*

* cited by examiner

ROBOTIC MACHINING APPARATUS METHOD AND SYSTEM FOR TURBINE BUCKETS

FIELD OF THE INVENTION

The subject matter disclosed herein relates to a robotic machining apparatus. Specifically, the subject matter disclosed herein relates to a robotic machining apparatus for machining turbine buckets to re-profile bucket tenons for reuse after the existing bucket covers have been removed.

BACKGROUND OF THE INVENTION

Because the current process of re-profiling tenons while the buckets are installed on the rotor is an all manual process the variance of tenon shape from bucket to bucket can vary quite substantially. The quality of the profile may vary significantly depending on the skill of the operator and ability to grind the tenon sufficiently accurately to match the template. The tenons may not be ground to the proper shape, or may be damaged by improper manual grinding techniques. Grinding tenons manually is also a time consuming process which may in some instances require up to 80 man hours to complete the grinding of a single row of buckets on a turbine. With the robotic system the tenons may be machined to precisely match the drawing. The sides of the tenon are positioned perpendicular to the vane tip.

With the current processes used for machining tenons, for bucket tenons to be lengthened the turbine rotor must be installed into a turning device or lathe. The tenons tips are machined with a carbide or high speed tool bit. The current machining process allows for machining on either side of the tenon, but not directly on the top or bottom of the tenon. Material that is unreachable for machining must be dressed manually with pneumatic grinding machines. Like re-profiling the quality of manual grinding or dressing is highly dependent on the skill level of the operator.

With a robotic system the rotor is not placed into a turning device or lathe. A robotic controller guides a robotic arm and spindle around the tenon and bucket tip and removes a prescribed amount of tenon material. Tenon material may be removed on the entire tip of the vane in a single setup. Machining robotically will provide substantially identical profiles or shapes on each bucket, since the vision system locates the cut path based on the geometry of the vane.

SUMMARY OF THE INVENTION

In one embodiment a robotic apparatus for machining fastener on a machine element is disclosed. The robotic apparatus includes a machining device having a spindle head. A robotic arm is coupled to the machining device and a base member is coupled to the robotic arm. The base member is mounted independently of the machine element. A vision system is provided for locating the fastener on the machine element. A control system is coupled to the vision system, the machining device and the robotic apparatus. The control system is configured to control movement of the robotic apparatus and the machining device based upon vision system data and spatial information about the fastener and the machine element.

In another embodiment, a method of machining fasteners on a turbine rotor is disclosed. The method includes positioning a robot arm perpendicular to a vane tip of the turbine rotor; directing a laser at a center point of a first tenon shape; storing the coordinates of the center point; confirming the location coordinates with reference to a position of a base member; performing a first orbit of the tenon along a programmed cut path based on a programmed shape of the tenon; performing at least a second orbit around the tenon having a smaller radial offset for each progressive orbit; adjusting the cut path for each consecutive orbit until the tenon is evenly machined over the surface; identifying a cut path for each subsequent bucket; identifying the remaining tenons in a group of tenons comprising the turbine rotor; identifying the center position of the tenon shape; and repeating the stored cut path for each tenon shape stored in the storage component.

Yet another embodiment discloses a system for machining fasteners on a turbine rotor. The system includes a surface. A portion of the turbine rotor is in contact with the surface. The portion of the turbine rotor includes a machine element having one or more fasteners. A robotic device for machining the fasteners has a machining device and a machining spindle. The robotic apparatus includes a robotic arm coupled to the machining device. A base member is coupled to the robotic arm. The base member is in contact with the surface independently of the turbine rotor portion. A vision system is provided on the robotic apparatus for locating the fastener or fasteners on the machine element. A control system is coupled to the vision system, the machining device and the robotic apparatus. The control system is arranged to control movement of the robotic apparatus and the associated machining device based upon vision system data and spatial information about the fasteners and the machine element.

An advantage of the disclosure is that the tenons may be machined to match the drawing. The machining is consistent from bucket to bucket. The opportunity to damage a tenon during re-profiling is drastically reduced compared to manual methods. The entire tip of the vane may be machined in a single setup without the need for a turning device such as a lathe, equal amounts of material will be removed from each vane tip, and the tenon will be machined perpendicular to the vane tip.

Commercial advantages are reduced labor costs. The reduced cycle time allows for extra capacity in the system. Re-profiling or tipping of bucket tips can be performed at a customer site with the buckets installed on the rotor without the need for a lathe. Welded tenons and bucket tips may therefore be machined with the buckets in place on the turbine rotor.

Other features and advantages of the present invention will be apparent from the following more detailed description of the preferred embodiment, taken in conjunction with the accompanying drawings which illustrate, by way of example, the principles of the invention.

DETAILED DESCRIPTION

Figure 1:
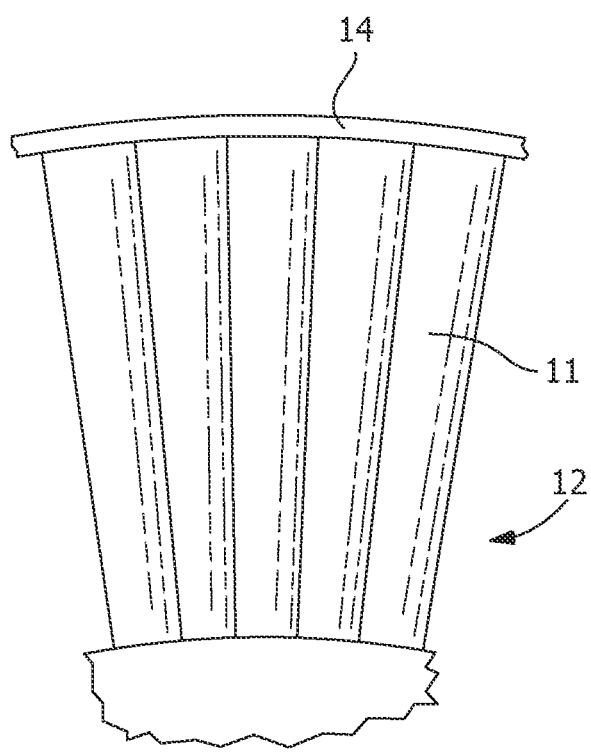
FIGS. 1-3 show fragmentary views of portions of a turbine for a tenon machining process.

A robotic turbine bucket machining system profiles bucket tenons for reuse after the existing bucket covers have been removed and also can increase the length of the tenons by cutting the vane tip material while the buckets remain installed on the rotor. Re-profiling of a tenon with the bucket installed on the rotor is currently done manually with a grinder to remove excess material from the tenon. The current process for extending tenon length or tipping is to position the turbine rotor in a turning device, machine the tips of the bucket vanes and manually dress the areas around the tenon.

The new robotic system, which will be discussed in detail below, incorporates an end mill on an electric machining spindle, which is guided around the tenon by a robot controller. The end mill machines, or mills, the tenon to a drawing dimension, or recipe, and simultaneously removes material from the tip of the bucket to lengthen the tenon. A touch probe on the end of the robotic arm is used to set the perpendicularity of the spindle to the bucket tip and accurately measure the location of the bucket tip. After machining is complete on the initial bucket, the robot indexes itself to the next bucket, finds the tenon with the vision system, and machines the tenon. This cycle is repeated until the robot arm is at its limit of reach.

The robotic turbine bucket machining system includes a robotic arm mounted to a base fabrication, a robot controller to guide the motion of the arm, an electrically powered machining spindle with tool changer as the end effector, a vision system to find features of the bucket and tenon, a laser probe to measure distance, and a touch probe to accurately locate surfaces. The robotic system is generally situated perpendicular to the rotational axis of the rotor, adjacent the row of buckets that are to be machined. The laser sensor and touch probe may be used to determine distance from the center of the rotor axis with respect to the robotic base. Once this distance is established the touch probe is used to accurately locate the surface of the tip of the bucket and orients the arm motion perpendicular to this surface. The digital tenon profile is loaded into the robot controller, e.g., by means of a portable memory device or by communication with a computer. The controller accesses the digital tenon profile to create the motion of the arm and spindle to replicate the tenon shape. The spindle houses an end mill which is then positioned by driving the arm roughly over the center of the tenon shape. A machining pass around the tenon is performed at a predetermined radial offset. The operator observes that the cut path is centered on the tenon and then adjusts the location of the cut path up, down, right, or left to align the motion to the tenon.

After the cut path is correctly set and the tenon is milled, the vision system is used to capture the location of the finished tenon as compared to the outline of the vane tip, in order to establish a 0,0 point for the tenon shape on the vane tip. The robotic arm is then indexed to the next bucket, the vision system identifies the outline of the vane tip, and the coordinate system of the tenon shape is transposed onto the vane tip. The end mill is then used to machine the second tenon. This process is repeated until all of the tenons are machined. The process to lengthen the tenons is substantially the same as described above, with the exception that an offset can be programmed into the arm motion such that the end mill of the spindle will cut a portion of the vane below the existing vane tip. The relative motion of the arm around the tenon does not change but the depth of cut is increased.

Figure 2:
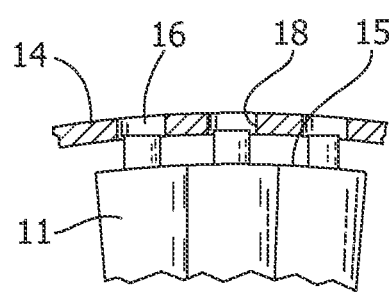
Figure 3:
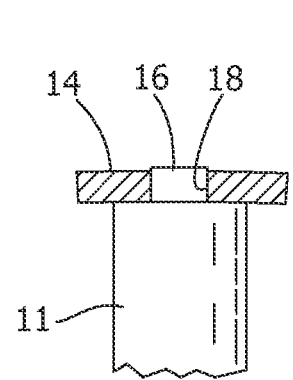

FIGS. 1-3 illustrate portions of the tenon machining process of a section of a turbine machine. FIG. 1 shows a plurality of buckets 11 forming part of a rotating component of a turbine, e.g., a steam turbine, 12. A cover plate 14 is shown secured to the outer tips of buckets 11, where cover plate 14 extends in a circumferential direction about buckets 11. FIGS. 2-3 show the tips of buckets 11 having one or more fasteners, or tenons, 16 projecting radially outward therefrom. Each cover plate 14 may include an arcuate circumferentially extending segment for spanning a plurality of buckets 11 (e.g., four or five buckets). Each cover plate 14 may include a plurality of openings 18 for receiving tenons 16. Tenons 16 may be received in openings 18 and peened to form a substantially flush cover design, as shown in FIG. 3.

Figure 4:
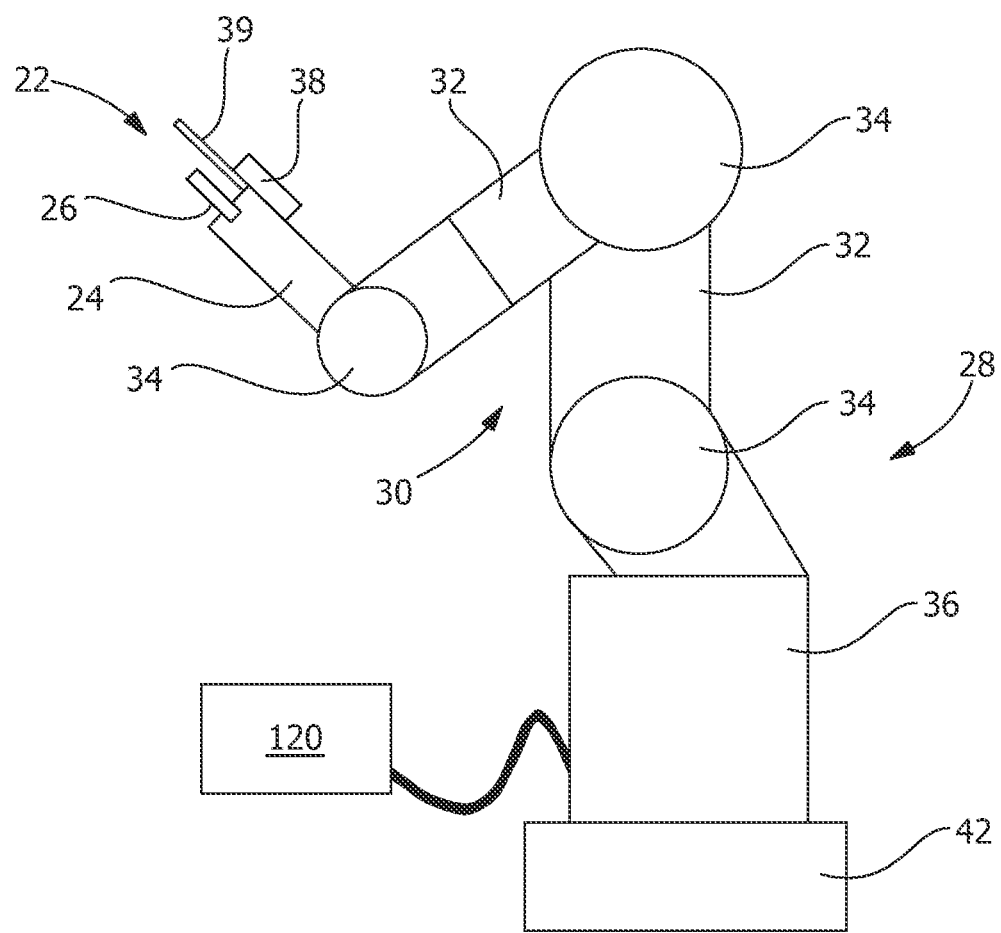
FIG. 4 shows a side schematic view of an apparatus for machining a tenon according to an exemplary embodiment.

Referring to FIG. 4, an exemplary robotic apparatus 28 and robot 22 for machining a tenon of a turbine bucket are shown. Robot 22 may include a machining spindle 24 having a milling head 26. Machining spindle 24 may include any conventional milling head 26 capable of machining a tenon at an end of a vane or bucket. In one embodiment, machining spindle 24 may be, e.g., an Eckstrom-Carlson machining spindle, Model No. SM-C6.1, manufactured by D&R Autochuck Manufacturing, Inc., of Rockford, Illinois, which is capable of milling a tenon at 6000 RPM at 6.1 hp. Milling head 26 may be formed of a metal, e.g., steel, which may be configured to mill a plurality of fasteners, e.g., metal tenons.

An exemplary embodiment of a robotic apparatus 28 may include a robotic arm 30 coupled to machining spindle 24. Robotic apparatus 28 and machining spindle 24 may be coupled in any conventional manner, e.g., via joints, welds, clamps, etc. Robotic arm 30 may include a plurality of segments 32 and joints 34 allowing robotic arm 30 to assist in machining tenons at different locations on a machine. Robotic apparatus 28 is also shown including a base member 36 coupled to robotic arm 30. It is understood that robotic apparatus 28 including robotic arm 30 and base member 36 may include electrical and electro-mechanical components capable of actuating movement of robotic arm 30 and/or machining spindle 24. These electrical and electro-mechanical components are known in the art of robotics, and are not described herein for clarity.

A vision system 38 is disclosed for locating a tenon 16 or other reference point on a machine element, e.g., a turbine cover plate (FIG. 1). Vision system 38 may include a conventional two-dimensional or three-dimensional optical recognition system, such as, for example, a camera, which may detect a location of a fastener on the machine element. Vision system 38 may be capable of high speed image acquisition and processing, and may locate a shape of a fastener 16 by optically recognizing the original fastener design (e.g., the original shape of a tenon as indicated by spatial information 140, described with reference to FIG. 2).

Robot 22 may also include a computer system 120 coupled to vision system 38, machining spindle 24, and robotic apparatus 28. Computer system 120 may be configured to control movement of robotic apparatus 28 and machining spindle 24 via a robotic control system 40 (FIG.5), based upon data received from vision system 38 and spatial information about the fastener and the machine element. Also shown in FIG. 4 is a shock absorbing member 42 coupled to base member 36. Shock absorbing member 42 may include one or more types of material capable of absorbing forces caused by vibrations within robotic apparatus 28. For example, shock absorbing member 42 may include a plurality of (e.g., three) distinct rubber vibration dampening pads, which may isolate the vibration of robotic apparatus 28 from a surface (not shown). In any case, shock absorbing member 42 may be configured to reduce vibration in robotic apparatus 28 and machining spindle 24, and improve the performance of robot 22.

Figure 5:
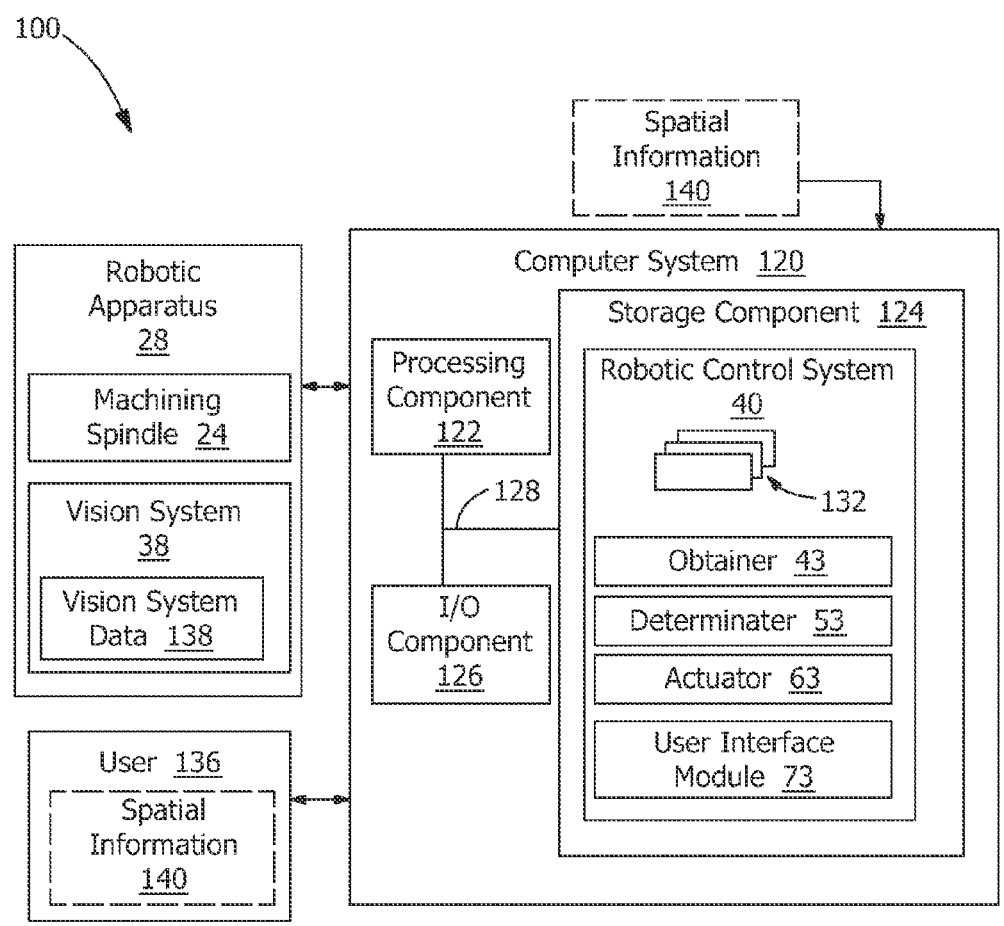
FIG. 5 shows an environment of a robotic apparatus for machining a tenon according to an exemplary embodiment.

Referring next to FIG. 5, an illustrative environment 100 for robotic machining tenons is disclosed. To this extent, environment 100 includes computer system 120, which can perform processes described herein in order to machine tenons using apparatus 28. In particular, computer system 120 is shown including a robotic control system 40, which makes computer system 120 operable to provide instructions to apparatus 28 for machining tenons by performing a process described herein.

Computer system 120 is shown in communication with apparatus 28, which may include machining spindle 24 and vision system 38. Further, computer system 120 is shown in communication with a user 136. A user 136 may be, for example, a programmer or operator. Interactions between these components and computer system 120 will be discussed in subsequent portions of this application. Computer system 120 is shown including a processing component 122 (e.g., one or more processors), a storage component 124 (e.g., a storage hierarchy), an input/output (I/O) component 126 (e.g., one or more I/O interfaces and/or devices), and a communications pathway 128. In one embodiment, processing component 122 executes program code, such as robotic control system 40, which is at least partially embodied in storage component 124. While executing program code, processing component 122 can process data, which can result in reading and/or writing the data to/from storage component 124 and/or I/O component 126 for further processing. Pathway 128 provides a communications link between each of the components in computer system 120. I/O component 126 can comprise one or more human I/O devices or storage devices, which enable user 136 to interact with computer system 120 and/or one or more communications devices to enable user 136 to communicate with computer system 120 using any type of communications link. To this extent, robotic control system 40 can manage a set of interfaces (e.g., graphical user interface(s), application program interface, and/or the like) that enable human and/or system interaction with robotic control system 40.

Computer system 120 can include one or more general purpose computing articles of manufacture, e.g., computing devices, capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, robotic control system 40 can be embodied as any combination of system software and/or application software. In any event, the technical effect of computer system 120 is to provide processing instructions to apparatus 28 in order to machine tenons.

Further, robotic control system 40 can be implemented using a set of modules 132. In this case, a module 132 can enable computer system 20 to perform a set of tasks used by robotic control system 40, and can be separately developed and/or implemented apart from other portions of robotic control system 40. Robotic control system 40 may include modules 132 which comprise a specific use machine/hardware and/or software. Regardless, it is understood that two or more modules, and/or systems may share some/all of their respective hardware and/or software. Further, it is understood that some of the functionality discussed herein may not be implemented or additional functionality may be included as part of computer system 120.

When computer system 120 comprises multiple computing devices, each computing device may have only a portion of robotic control system 40 embodied thereon, e.g., one or more modules 132. However, it is understood that computer system 120 and robotic control system 40 are only representative of various possible equivalent computer systems that may perform a process described herein. To this extent, in other embodiments, the functionality provided by computer system 120 and robotic control system 40 can be at least partially implemented by one or more computing devices that include any combination of general and/or specific purpose hardware with or without program code. In each embodiment, the hardware and program code, if included, can be created using standard engineering and programming techniques, respectively.

The computing devices can communicate over any type of communications link. Further, while performing a process described herein, computer system 120 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, robotic control system 40 enables computer system 120 to provide processing instructions to apparatus 28 for machining tenons. Robotic control system 40 may include logic, which may include the following functions: an obtainer 43, a determinator 53, an actuator 63 and a user interface module 73. In one embodiment, robotic control system 40 may include logic to perform the above-stated functions. Structurally, the logic may take any of a variety of forms such as a field programmable gate array (FPGA), a microprocessor, a digital signal processor, an application specific integrated circuit (ASIC) or any other specific use machine structure capable of carrying out the functions described herein. Logic may take any of a variety of forms, such as software and/or hardware. However, for illustrative purposes, robotic control system 40 and logic included therein will be described herein as a specific use machine. As will be understood from the description, while logic is illustrated as including each of the above-stated functions, not all of the functions are necessary according to the teachings of the invention as recited in the appended claims.

Figure 6A:
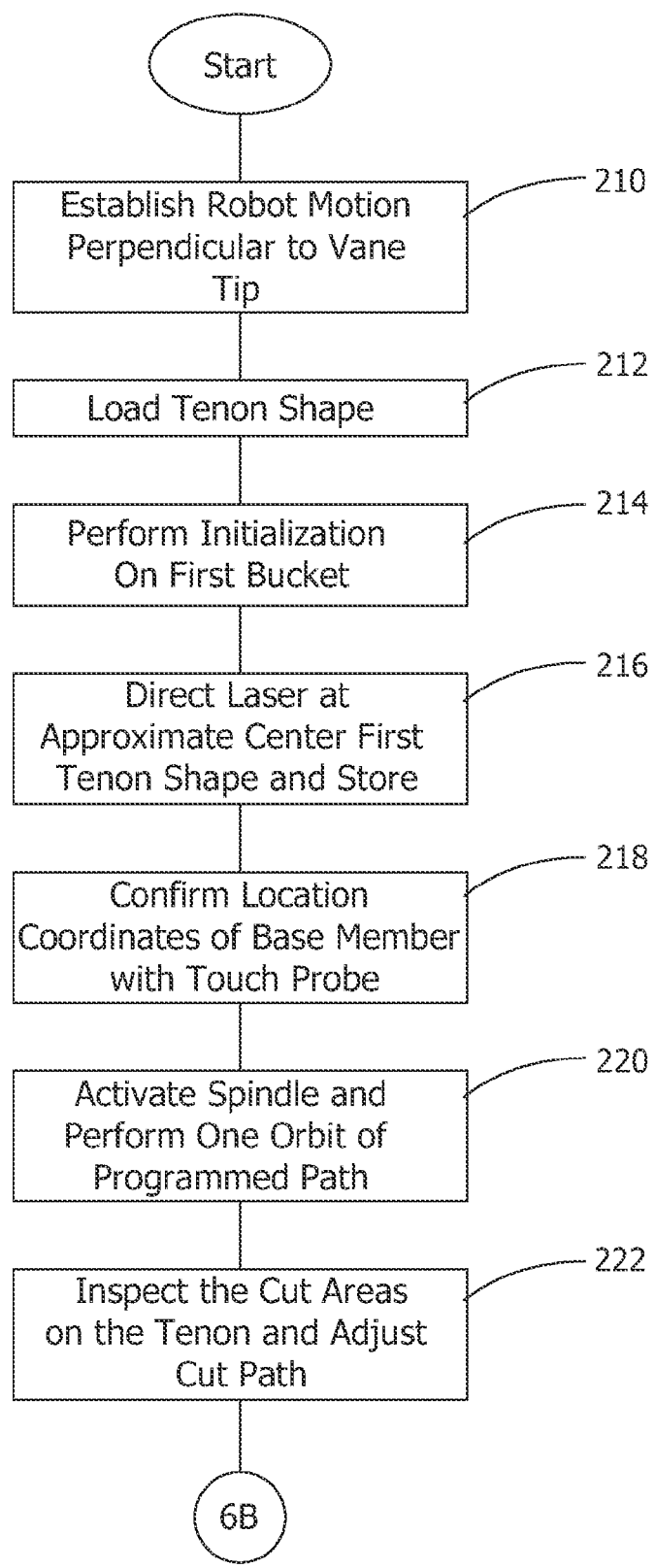
FIGS. 6A-6C show a flow diagram of an exemplary method for machining tenons of a turbine rotor.
Figure 6B:
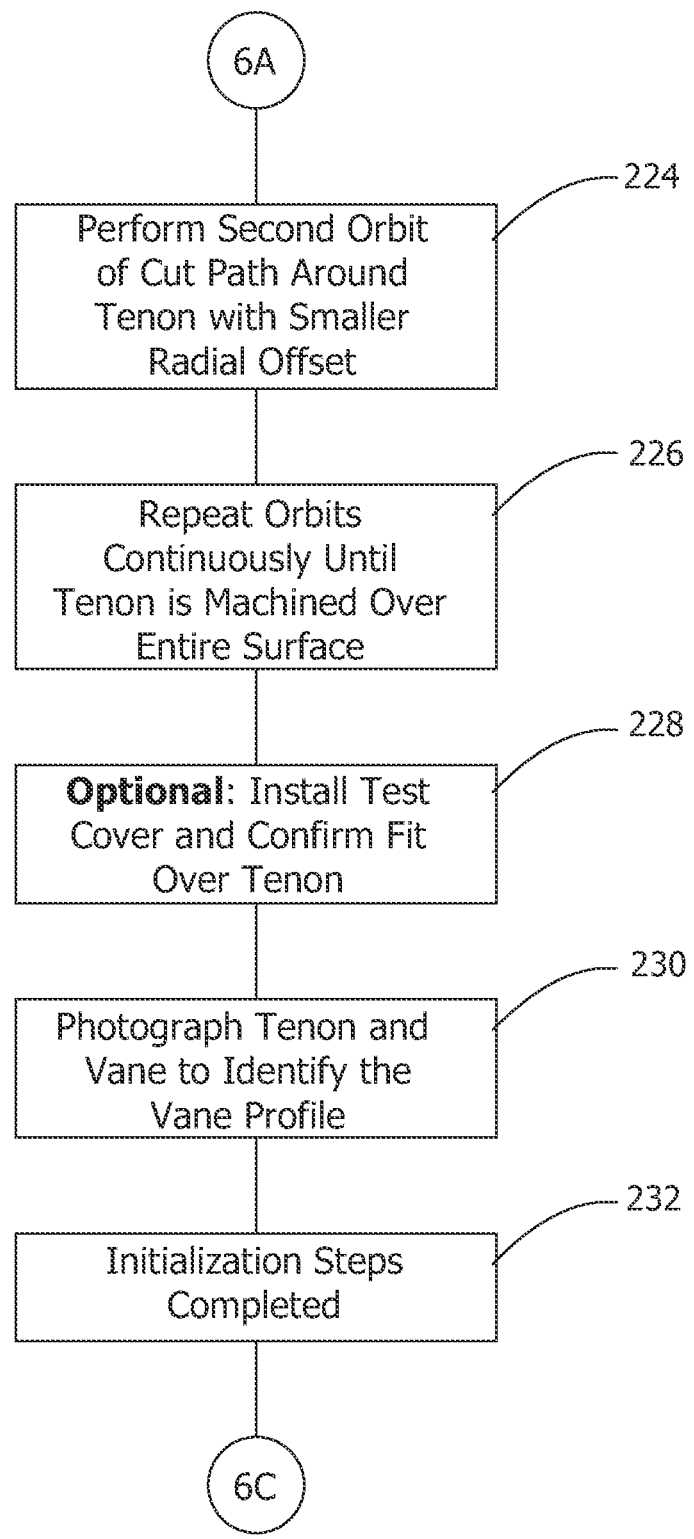
Figure 6C:
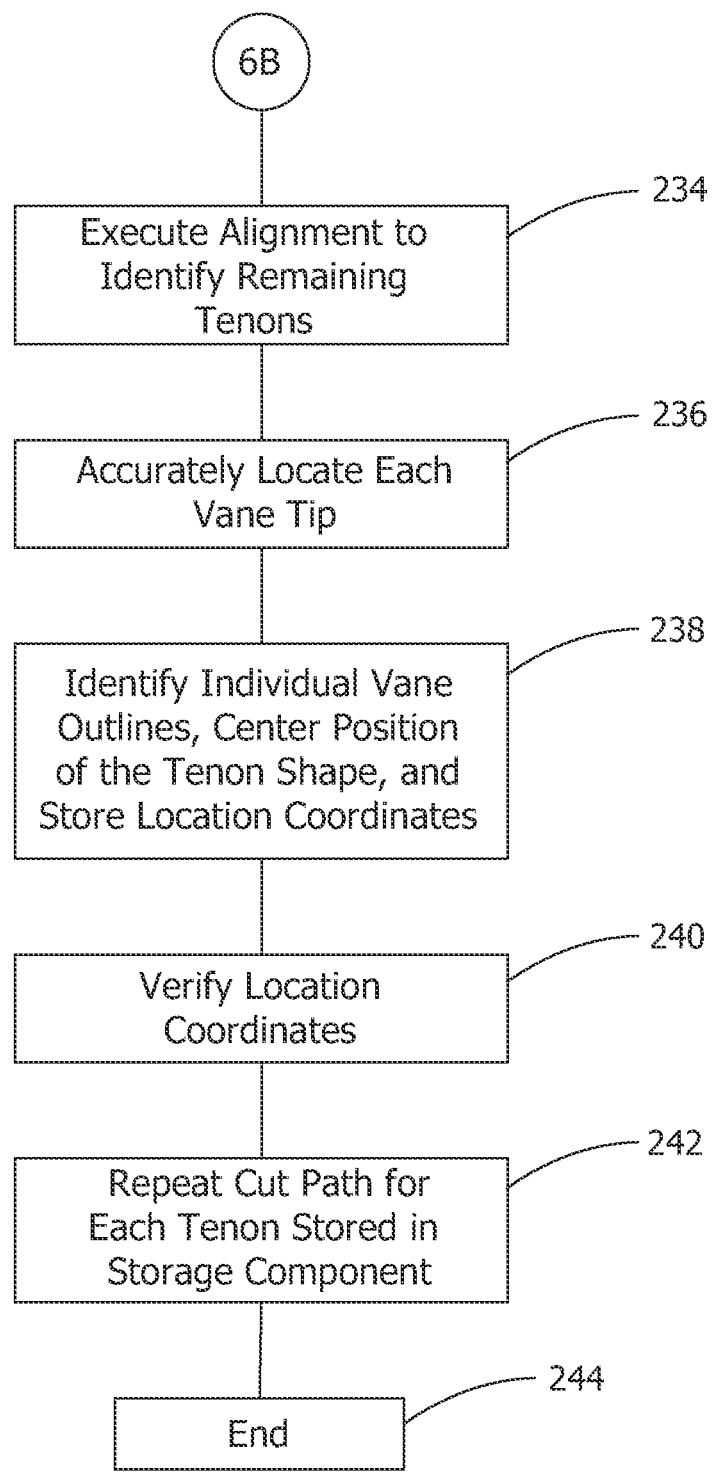

Referring next to FIGS. 6A through 6C, a method for machining tenons is shown. At step 210, perpendicularity of the robot motion relative to the vane tip tip 15 (FIG. 1) is established by touching the robot arm on both sides of the tip and then calculating the planar surface of the cover. Next, at step 212, a program for the desired tenon shape is loaded. Then the initialization steps are performed on the first bucket only as follows:

First at step 216, the robot arm 30 is driven so that the red laser is directed to the approximate center of the first tenon shape. Next the laser is triggered to store the approximate center point. Next, at step 218, touch probe 39 (FIG. 4) is moved into contact with vane tip 15 (FIG. 1) to confirm the location coordinates of base member 36. At step 220, spindle 24 is activated and performs one orbit of a programmed cut path based on the tenon shape at a radial offset, e.g., 3 millimeters (3 mm). Next, at step 222, the operator inspects the cut areas on the tenon and selects to adjust the cut path up, down, left, or right by a specified dimension on the computer interface, e.g., a Human Machine Interface (HMI), to correspond with witness marks on the base of tenon 16. At step 224 spindle 24 performs a second pass around the tenon with a smaller radial offset, e.g., 2.5 mm. Next, at step 226 the operator adjusts the cut path based on the areas cut on the tenon. Each time the operator adjusts the cut path the zero (0,0) coordinates for the location of the tenon shape is reset to the new position. The operator continues to adjust the cut path until tenon 16 has been machined evenly over the entire surface. At step 228 a test cover or gage (not shown) made from cover stock may be installed onto tenon 16 to confirm that an actual turbine bucket cover fits onto the milled tenon. Next, at step 230, tenon 16 and vane 11 are photographed and vision system 38 is programmed to identify the vane profile. The vane profile may be used to identify the milling path on subsequent buckets. At step 232, the initialization steps are complete.

Next, at step 234, an alignment program is executed to identify the other tenons in the group. Touch probe 39 on an end of robot arm 30 contacts the top of each vane 11 in the group to accurately locate vane tip 15. Next, at step 238, vision system 38 identifies each individual vane outline, identifies the center position of the tenon shape, and stores the location coordinates of the tenon in controller storage component 124. Next, after identifying all of the tenons, vision system 38 directs a red laser dot to the center of each tenon 16 and the operator verifies the location coordinates at step 240. Next, at step 242, machining spindle 24 is driven over the cut path for the tenon based on the first trained bucket 0,0 point, and repeats the cut path for each tenon stored in storage component 124. At step 244 the process may be terminated upon completion of the tenon machining steps above.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. it robotic apparatus for machining fastener on a machine element, the apparatus comprising:
   a machining device having a spindle head;
   a robotic apparatus including:
   a robotic arm coupled to the machining device; and
   a base member coupled to the robotic arm, the base member mounted independently of the machine element;
   a vision system for locating the fastener on the machine element;
   a touch probe on the robotic arm configured to set the perpendicularity of the spindle head to the machine element; and
   a control system coupled to the vision system, the machining device and the robotic apparatus, the control system configured to control movement of the robotic apparatus and the machining device based upon vision system data and spatial information about the fastener and the machine element;
   wherein the vision system and the touch probe are further configured for determining distance and location; and
   wherein after machining the first fastener on the first element the control system is further configured to identify at least one other fastener, store location coordinates of each of the at least one other fasteners, and repeat a cut path of a first fastener for each of the at least one other fasteners.

2. The apparatus of claim 1, wherein the machine element is a turbine cover plate coupled to at least one turbine blade by the fastener.

3. The apparatus of claim 2, wherein the at least one turbine blade is one of a plurality of turbine blades forming a portion of a turbine assembly.

4. The apparatus of claim 1, wherein the machining device is programmed to actuate the machining device in a predefined pattern in response to a command from the control system.

5. The apparatus of claim 1, wherein the machining device includes a machining spindle and milling head.

6. The apparatus of claim 1, wherein the vision data includes data about a location of a reference point of the fastener.

7. A system for machining fasteners on a turbine rotor, the system comprising:
   a surface;
   a portion of the turbine rotor in contact with the surface, the portion of the turbine rotor including a machine element having at least one fastener thereon;
   a machining device having a machining spindle; and
   a robotic apparatus for machining the at least one fastener, the robotic apparatus comprising:
   a robotic arm coupled to the machining device;
   a base member coupled to the robotic arm, the base member in contact with the surface independently of the portion of the turbine rotor;
   a vision system for locating the at least one fastener on the machine element;
   a touch probe on the robotic arm configured to set the perpendicularity of the spindle head to the machine element; and
   a control system coupled to the vision system, the machining device and the robotic apparatus, the control system configured to control movement of the robotic apparatus and the machining device based upon vision system data and spatial information about the at least one fastener and the machine element;
   wherein the vision system and the touch probe are further configured for determining distance and location; and
   wherein after machining the first fastener on the first element the control system is further configured to identify at least one other fastener, store location coordinates of each of the at least one other fasteners, and repeat a cut path of a first fastener for each of the at least one other fasteners.

* * * * *